United States Patent
Arai

(10) Patent No.: US 12,292,678 B2
(45) Date of Patent: May 6, 2025

(54) PROJECTING APPARATUS, LIGHT EMISSION CONTROL METHOD AND STORAGE MEDIUM

(71) Applicant: CASIO COMPUTER CO., LTD., Tokyo (JP)

(72) Inventor: Toshiharu Arai, Akishima (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 504 days.

(21) Appl. No.: 17/477,217

(22) Filed: Sep. 16, 2021

(65) Prior Publication Data

US 2022/0091494 A1 Mar. 24, 2022

(30) Foreign Application Priority Data

Sep. 18, 2020 (JP) ................................. 2020-157495

(51) Int. Cl.
*G03B 21/20* (2006.01)
*H05B 47/105* (2020.01)

(52) U.S. Cl.
CPC ....... *G03B 21/2053* (2013.01); *H05B 47/105* (2020.01)

(58) Field of Classification Search
CPC .......................... G03B 21/2053; H05B 47/105
USPC ........................................................ 353/85
See application file for complete search history.

(56) References Cited

U.S. PATENT DOCUMENTS

| | | | | |
|---|---|---|---|---|
| 2004/0070563 A1* | 4/2004 | Robinson | ............. | H04N 9/3129 348/E9.026 |
| 2007/0229772 A1* | 10/2007 | De Vaan | ................ | G03B 21/14 348/E9.026 |
| 2014/0176918 A1* | 6/2014 | Ozawa | ............... | G03B 21/2026 353/121 |
| 2016/0164256 A1* | 6/2016 | Kuratomi | ........... | G03B 21/2033 315/297 |

FOREIGN PATENT DOCUMENTS

| | | | | |
|---|---|---|---|---|
| JP | 2006-154671 A | 6/2006 | | |
| JP | 2007-025054 A | 2/2007 | | |
| JP | 2010-008452 A | 1/2010 | | |
| JP | 201000452 A | * 1/2010 | ............. | G03B 21/00 |
| JP | 2013-134283 A | 7/2013 | | |
| JP | 2015-087575 A | 5/2015 | | |
| JP | 2016-040566 A | 3/2016 | | |
| JP | 2016-161916 A | 9/2016 | | |

OTHER PUBLICATIONS

JPO; Application No. 2020-157495; Notice of Reasons for Refusal dated Aug. 23, 2022.

* cited by examiner

*Primary Examiner* — Jerry L Brooks
(74) *Attorney, Agent, or Firm* — Fitch, Even, Tabin & Flannery LLP

(57) ABSTRACT

A projecting apparatus includes a projector configured to output projected light; a receiver configured to obtain from outside, image data of a target image projected by the projector; and a processor configured to control operation of the projector. The processor is configured to set a light intensity of the projected light to a light decreased state lower than a standard value when the image data is not obtained by the receiver.

15 Claims, 5 Drawing Sheets

PROJECTING APPARATUS, LIGHT EMISSION CONTROL METHOD AND STORAGE MEDIUM

CROSS-REFERENCE TO RELATED APPLICATION

This application is based upon and claims the benefit of priority under 35 USC 119 of Japanese Patent Application No. 2020-157495, filed on Sep. 18, 2020, the entire disclosure of which, including the description, claims, drawings, and abstract, is incorporated herein by reference in its entirety.

BACKGROUND

1. Field of the Invention

The present disclosure relates to a projecting apparatus, a light emission control method and a non-volatile storage medium which stores a program.

2. Description of the Related Art

There is a projecting apparatus which projects an image based on image data on a screen or a wall and displays the image. The projecting apparatus receives input of the image data from external devices and displays the image. Therefore, when the projecting apparatus is not connected to an external device, only light is output. In order to suppress unnecessary light emission and output of light, as shown in JP2016-161916, there is a technique in which light is not output when there is no input of signals from external devices or there is no connection to external devices.

BRIEF SUMMARY OF THE INVENTION

According to one aspect of the present invention, a projecting apparatus includes, a projector configured to output projected light; a receiver configured to obtain from outside, image data of a target image projected by the projector; and a processor configured to control operation of the projector, wherein, the processor is configured to set a light intensity of the projected light to a light decreased state lower than a standard value when the image data is not obtained by the receiver.

According to another aspect, a light emission control method for a projecting apparatus including a projector configured to output projected light, and a receiver configured to obtain from outside, image data of a target image projected by the projector, the method comprising: setting a light intensity of the projected light to a light decreased state lower than a standard value when the image data is not obtained by the receiver.

According to another aspect, a non-transitory computer-readable storage medium having a program stored thereon for controlling a computer used in a projecting apparatus including a projector configured to output projected light, and a receiver configured to obtain from outside, image data of a target image projected by the projector, the program controlling the computer to perform, setting a light intensity of the projected light to a light decreased state lower than a standard value when the image data is not obtained by the receiver.

DETAILED DESCRIPTION OF THE INVENTION

The embodiments of the present invention are described with reference to the drawings.

First Embodiment

The projecting apparatus 1 according to the present embodiment is portable and a projecting operation can be performed with a battery 21 so that the projecting apparatus 1 does not need to receive supply of electric power from external commercial power sources.

Figure 1:
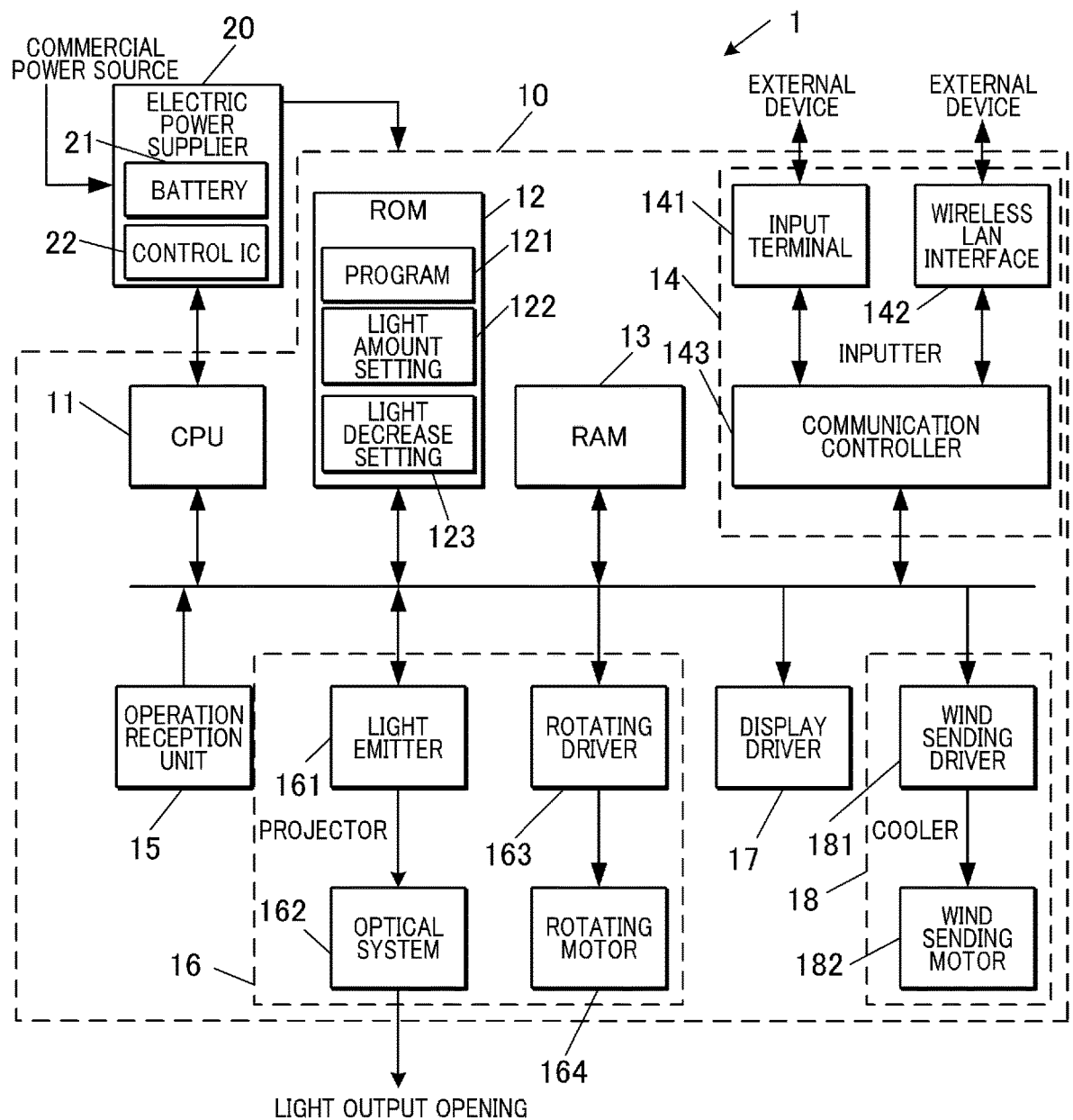
FIG. 1 is a block diagram showing a functional configuration of a projecting apparatus 1 according to a first embodiment.

FIG. 1 is a block diagram showing a functional configuration of the projecting apparatus 1 according to the first embodiment.

The projecting apparatus 1 includes a main body portion 10 and an electric power supplier 20. The main body 10 which performs projection of the image includes a substantial rectangular shape and unevenness in each surface. Alternatively, the projecting apparatus 1 may be a shape different from a rectangle, for example, an elliptic cylinder. The output opening of the projected light is positioned on a first surface (front surface) of a projecting apparatus 1. A plurality of leg portions, for example, three leg portions in which the length can be changed and fixed are provided on a second surface orthogonal to a front surface. The length of each leg is adjusted so that a direction that the projected light is output, that is, a direction that the image is projected can be determined. The projecting apparatus 1 does not have to be provided using the second surface as the providing surface. Alternatively, the projecting apparatus 1 can be rotated 90 degrees and placed vertically, or the projecting apparatus 1 can be provided upside down and be suspended and fixed from above. When the projecting apparatus 1 is placed vertically, the leg portion can be provided on a surface other than the second surface so that the projecting direction can be adjusted, or the leg on the second surface can be detached and an attaching portion can be provided on another surface so as to be able to attach the leg portion.

An intake opening is provided as necessary on each of the four surfaces including the second surface and orthogonal to the first surface, and an exhaust opening is provided on a front surface. On a back surface facing the front surface, an input terminal 141 of the cable connected to the external device and a connection terminal of the electric supply cable connected to the electric power supplier 20 are provided.

The electric power supplier 20 includes a battery 21 and the electric power input from the battery 21 or an external AC power source (external power source, mainly a commercial power source) is supplied to the main body 10 at a predetermined voltage. The electric power supplier 20 includes a conversion circuit which rectifies AC power from the commercial power source and suitably converts the power to DC power. The battery 21 is a secondary battery which can be charged by electric power supplied from the commercial power source. The battery 21 is not limited and may be a lithium ion battery, for example. The electric power supplier 20 may be provided externally connected to the main body 10 through a cable, that is, the electric power supplier 20 can be detached from the main body 10 when the main body 10 is not operating.

The electric power supplier 20 includes a control IC 22. The control IC 22 determines whether to supply electric power to the main body 10 from the commercial power source or the battery 21 (selectively) according to whether electric power is input from the commercial power source (connected or not) and the voltage (accumulated charge amount) in the battery 21. The control IC 22 also switches the charge and the discharge of the battery 21. The control IC 22 detects the output voltage and outputs the detection result as necessary or at a suitable frequency to the main body 10 (CPU 11).

The main body 10 includes a CPU 11 (Central Processing Unit) (controller, computer, processor), a ROM 12 (Read Only Memory), a RAM 13 (Random Access Memory), an inputter 14 (obtainer, receiver), an operation reception unit 15 (operation reception apparatus), a projector 16 (projector), a display driver 17, and a cooler 18. The CPU 11 is connected to each unit through a bus.

The CPU 11 is a hardware processor which centrally controls the operation of the main body 10. The number of CPU 11 is not limited to one and a plurality of devices can operate separately or operate parallel according to the function.

The ROM 12 is a nonvolatile memory such as a mask ROM and a flash memory, and stores a program 121 and various setting data. The program 121 includes a control program to output the projection of the image according to the image data obtained from outside and a control program to perform light emission when started as described later. The setting data includes a light amount setting 122 and a light decrease setting 123.

The RAM 13 provides a memory space for work to the CPU 11 and stores temporary data.

The light amount setting 122 stored in the ROM 12 includes an operation setting according to an intensity (light intensity) of light (projected light) output by a light emitter 161 of the projector 16. The intensity suitable to project light from the projecting apparatus 1 depends on a brightness where projecting is performed and a distance to the projecting surface. Depending on the above, the light intensity may be adjusted. The light intensity when started, can be determined in advance within a range which does not exceed a maximum light emission intensity described later, and the setting value is stored in the light amount setting 122. When the setting value exceeds the later-described maximum light emission intensity for the battery, the setting value equal to or lower than the maximum light emission intensity for the battery can be determined separately for when the power is supplied from the battery 21 as described later.

The light decrease setting 123 includes a setting when the light is output with the light reduced more than the normal light intensity determined by the light amount setting 122 when there is no input of the image data as described later.

The inputter 14 receives the input of the image data of the image to be projected from the external device, obtains the image data, and performs processes such as deploying as necessary. The inputter 14 includes an input terminal 141 (connection terminal), a wireless LAN interface 142, and a communication controller 143.

The input terminal 141 is connected to external devices through a cable. The input terminal includes, for example, various terminals regarding an analog RGB signal, a USB (Universal Serial Bus) terminal, a HDMI (High Definition Multimedia Interface) terminal, and the like, and the input terminal 141 can be provided so that any can be selected from the plurality of the above.

The wireless LAN interface 142 receives radio waves from external devices through an antenna which is not illustrated according to a standard of wireless LAN (IEEE 802.11, etc.) and demodulates the radio waves. The wireless LAN interface 142 includes a network card and the connection for communication can be made with external devices by wireless LAN based on the identification information.

The communication controller 143 controls the obtaining of the image data through the input terminal 141 and the wireless LAN interface 142 (wireless communicator) and performs a process to deploy data as necessary. The communication controller 143 may expand the obtained image data when the obtained image data is moving image data, and process the data to be used for driving the image display. The communication controller 143 may include the processor dedicated to the above image data process. The processor may be a dedicated CPU separate from the CPU 11 which performs overall control or a logical circuit.

The operation reception unit 15 receives the input operation from outside such as the user, and outputs the above as an input signal to the CPU 11. For example, the operation reception unit 15 includes a press button switch which can be easily operated by the user. A plurality of press button switches can be provided to be used for switching the on and off of the power supply and to be used for various settings. The operation reception unit 15 may also include a separate remote controller. In this case, the operation reception unit 15 may include a reception unit to receive a signal (infrared signal, etc.) from the remote controller. Although not limited, providing a protective material to prevent errors in operation such as a sliding cover on the press button switches leads to decrease in operability. Therefore, here, the protective material is not included. On the other hand, two or more sets of input operations may be requested for various operations other than starting and ending. For example, an operation to call the setting menu and the actual setting operation may be requested. Specifically, the setting is to be made so that the increase of the light intensity (change or may only be only a setting to be in a later described light reduced state) is not performed by one unintentional input operation. An operation which continues a predetermined length (long press) may be requested for the input received by one operation such as starting and ending.

The projector 16 generates light in each color of RGB, and the above light is used to output the projected light. The projector 16 outputs light from each output opening at a pixel position and timing according to the image data regarding the image to be projected and the projected light is obtained. The projector 16 includes a light emitter 161 (light emission apparatus), an optical system 162, a rotating driver 163, and a rotating motor 164.

The light emitter 161 includes a laser diode or an LED (Light Emitting Diode), for example, and emits light with a predetermined wavelength. Here, for example, the light emitter 161 includes a red LED and a blue laser diode, and generates red light and blue light, respectively. The light emission intensity of the light emitter 161 can be changed within a setting range determined by a current strength in advance.

The optical system 162 suitably reflects and condenses the generated light in each color and guides the light to the output opening of the projecting apparatus 1. The optical system 162 includes one or all of the various types of the following, an optical lens, a prism, a mirror, and a filter. At least some of the above components can move in an optical axis direction to adjust a focal point position. The optical system 162 may include a movable mirror such as a digital (micro) mirror device (DMD) according to the display pixel number.

The rotating driver 163 rotates the rotating motor 164 at a predetermined rotating speed.

The rotating motor 164 rotates a fluorescent plate which is not illustrated. The fluorescent plate receives blue light and emits green light. That is, light in the wavelength bands for the three colors of the RGB can be output by the light emitter 161 emitting blue and red and the fluorescent plate.

The display driver 17 performs the operation to adjust the output position and the timing of the light from the output opening according to the image data of the projecting target. The display driver 17 operates the movable mirror, and changes the reflecting angle between the timing that the light in each wavelength is output to the pixel positions and the timing that the light is not output. With this, the light at a desired wavelength band is output from the output opening to a desired pixel position (direction) only at the output timing.

The cooler 18 discharges heat from each unit due to light emission of the light emitter 161. The cooler 18 includes a wind sending driver 181 and a wind sending motor 182. The wind sending motor 182 rotates the fan which discharges heat from inside the case of the projecting apparatus 1. The wind sending driver 181 drives and rotates the wind sending motor 182 at a predetermined rotating speed. The operation of the wind sending motor 182 (fan), for example, may start with the start of the light emission by the light emitter 161, and may continue until a predetermined amount of time passes after stopping the light emission of the light emitter 161.

Next, the operation when the apparatus is started according to the present embodiment is described.

When the electric power supply from the commercial power source or the battery 21 is received, the projecting apparatus 1 emits light according to the input operation received on the operation reception unit 15 and the projection of the image regarding the image data. In the projecting apparatus 1, the light intensity, especially, the light emission intensity when projected at a brightness as the standard can be changed and adjusted at a plurality of levels (a predetermined number of 2 or more) within the set range, here five levels. Hereinbelow, unless otherwise specified, the light emission intensity at the standard brightness is to be the light intensity.

Figure 2A:
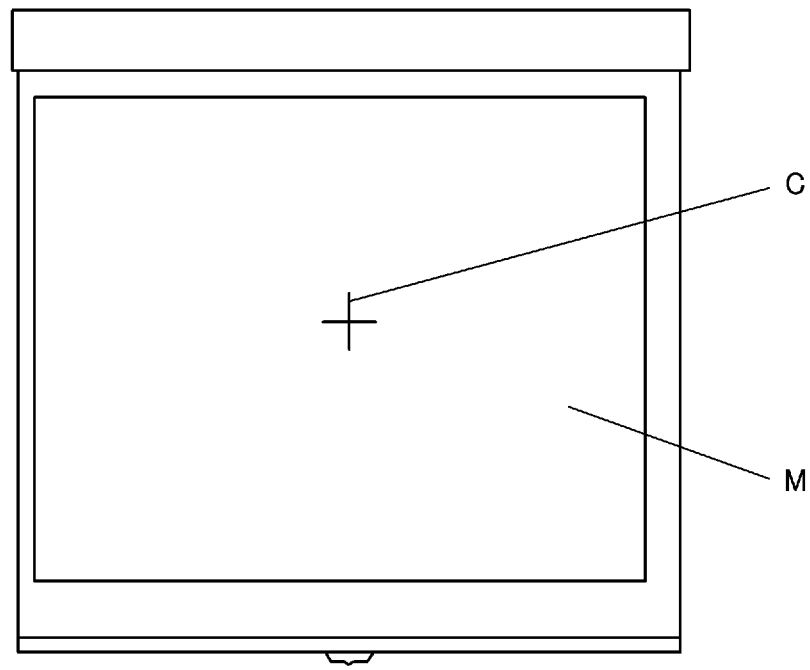
FIG. 2A is a diagram showing an initial display example.
Figure 2B:
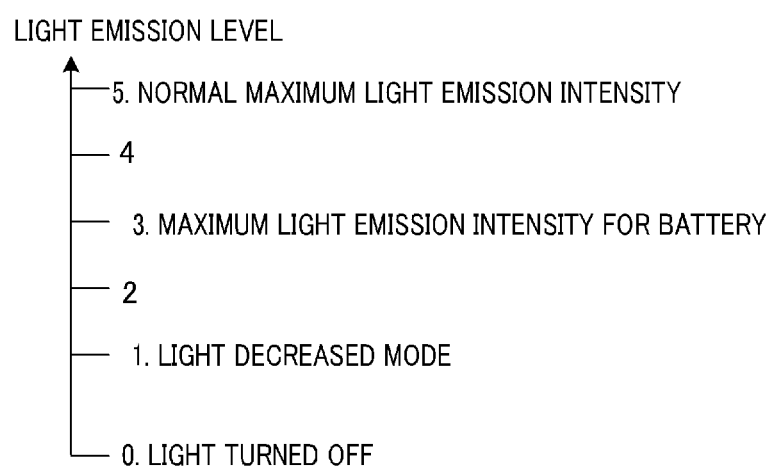
FIG. 2B is a diagram showing an example of a setting of light emission intensity.

FIG. 2A is a diagram showing an example of an initial display. FIG. 2B is a diagram showing an example of a setting of a light emission intensity. After the light emission is started, when the image data is input (obtained) from external devices, the display driver 17 performs the driving operation according to the image data. When the image data is not input (not obtained), a no-input image is output. The no-input image (display state in a light reduced state) includes any of the following including a white screen, a blue screen, a black screen (there is output of light), or a screen in which areas in a plurality of colors such as RGB are aligned. The no-input image can be set through the operation reception unit 15 in advance or during the display in a light reduced state.

As shown in FIG. 2A, in the no-input image, various indexes C, symbols, letters, or a combination of the above can be projected and displayed together with a background display portion M (display color, for example, white screen). For example, indexes such as a plus mark or square brackets are projected to perform positioning of the display or the adjusting of the focus, or specific letters (symbols) or a string of letters (string of symbols) can be projected. For example, a string of letters or symbols clearly showing that it is a light reduced state can be projected. Regardless of whether the image data is input, the setting menu in response to calling of the setting menu and the letters and figures regarding the screen to receive the change of the setting can be projected. In a state waiting for network connection, the SSID and the IP address of the external devices can be obtained and displayed. The set contents are stored in a rewritable portion of the ROM 12 and read and set when in a state in which the light of the display is reduced.

The electric power regarding the light emission consumes a large amount of the electric power consumed in the projecting apparatus 1. When a storage capacity of the battery 21 becomes large, size and weight of the electric power supplier 20 increases in this amount, and this reduces portability. Therefore, it is difficult to increase the storage capacity larger than necessary. Therefore, preferably, when the main body 10 receives electric power supply from the battery 21, the light emission is not made brighter than necessary (light intensity of the projected light is decreased), and the unnecessary light emission time is shortened.

As shown in FIG. 2B, compared to when the electric power is supplied from the commercial power source, when the electric power is supplied from the battery 21, the maximum light emission intensity is determined to be low in the projecting apparatus 1. For example, normally, when the electric power is supplied from the commercial power source, the normal maximum light emission intensity is set to a maximum level (level 5) among the five levels of the light emission intensity. On the other hand, when the electric power is supplied from the battery 21, the maximum light emission intensity for the battery can be set to the third level from the top (level 3) among the five levels of the light emission intensity. Therefore, when the electric power is supplied from the commercial power source, the imaging apparatus 1 may allow the light emitter 161 to emit light at any of the levels 1 to 5. When the electric power is supplied from the battery 21, the imaging apparatus 1 may allow the light emitter 161 to emit light at any of the levels 1 to 3. The initial setting is stored in the ROM 12 as the light amount setting 122, and according to the operation of input by the user, the setting can be changed within the range not exceeding the normal maximum light emission intensity and the maximum light emission intensity for the battery. When the absolute value of the normal maximum light emission intensity is not that large, the maximum light emission intensity for the battery can be the same level as the normal maximum light emission intensity.

In the projecting apparatus 1, when the electric power is supplied from the battery 21 and the image data is not input (obtained) from the external device (inputter 14) the state progresses to the light decreased state with a light emission intensity lower than the maximum light emission intensity for the battery (standard value). Here, the light decreased state does not include a state in which there is no light emission. Here, the light decreased state is to be the lowest light emission intensity (level 1, minimum in the setting range) among the five stages of the light emission intensity. The light emission intensity of the light decreased state is stored in the ROM 12 as a light decrease setting 123. The light emission intensity in the light decreased state can be changed by input operation by the user within a range which does not exceed the standard value.

The lowest light emission intensity is to be a level in which the projected contents of the image can be read in an environment in which the outside light is mostly cut in a hall with no (few) windows or a meeting room with room darkening curtains or the lighting near the projected surface is suppressed. That is, according to the five levels of light emission intensity set here, the contents can be read by the viewer at any level if the environment where the image is projected is not bad. That is, the plurality of light emission intensities are changed at a level which can be used to project the image according to the status of use, and do not have to include the level that is too dark to be used for projecting the image. However, a setting of a level with a very weak light emission intensity may be separately included. It may be a little difficult to view the image but the focal point and the range of display can be adjusted at such level.

When the projecting apparatus 1 is used, normally, not so much time is necessary to prepare the positioning and the focusing. Therefore, when the power is supplied from the battery 21, the light emission operation by the light emitter 161 may be stopped when a standard amount of time such as 5 minutes passes after the image data is input from the external device. If the user does not want to stop the light emission without outputting the image, some kind of input operation is performed on the operation reception unit 15 to reset elapsed time. Some kind of input operation may be set freely or may be limited to an effective operation such as changing the setting (including a string of operations to end without changing such as confirm or cancel).

Limiting the light emission intensity when the electric power is supplied from the battery 21 is effective not only for convenience in normal preparation and during standby but also for unintended starting. When the start button of the operation reception unit 15 is positioned with priority on the operability, there may be contact with the projected portion and the projected portion may be pressed unintentionally, especially when the apparatus is transported. When the battery 21 is connected during transporting, the projecting apparatus 1 may start by such unintentional operation, and the light emitter 161 may turn on. The light emitter 161 being lit is a complete waste of electric power. Moreover, the output light may irradiate a storage member such as a bag for transporting or a storage bag at a close distance and may apply heat. Further, such heat may be transmitted to the projecting apparatus 1 and may cause an unusual increase of the temperature. When the light emitter 161 is lit as described above, no signal is input. Therefore, by setting the light emission intensity to the lowest level when there is no input of the signal, when the light emitter 161 is turned on normally, the positioning and the focusing may be performed. Moreover, unnecessary consumption of electric power can be suppressed, and the problems caused by an unusual increase of the temperature can be suppressed.

Figure 3:
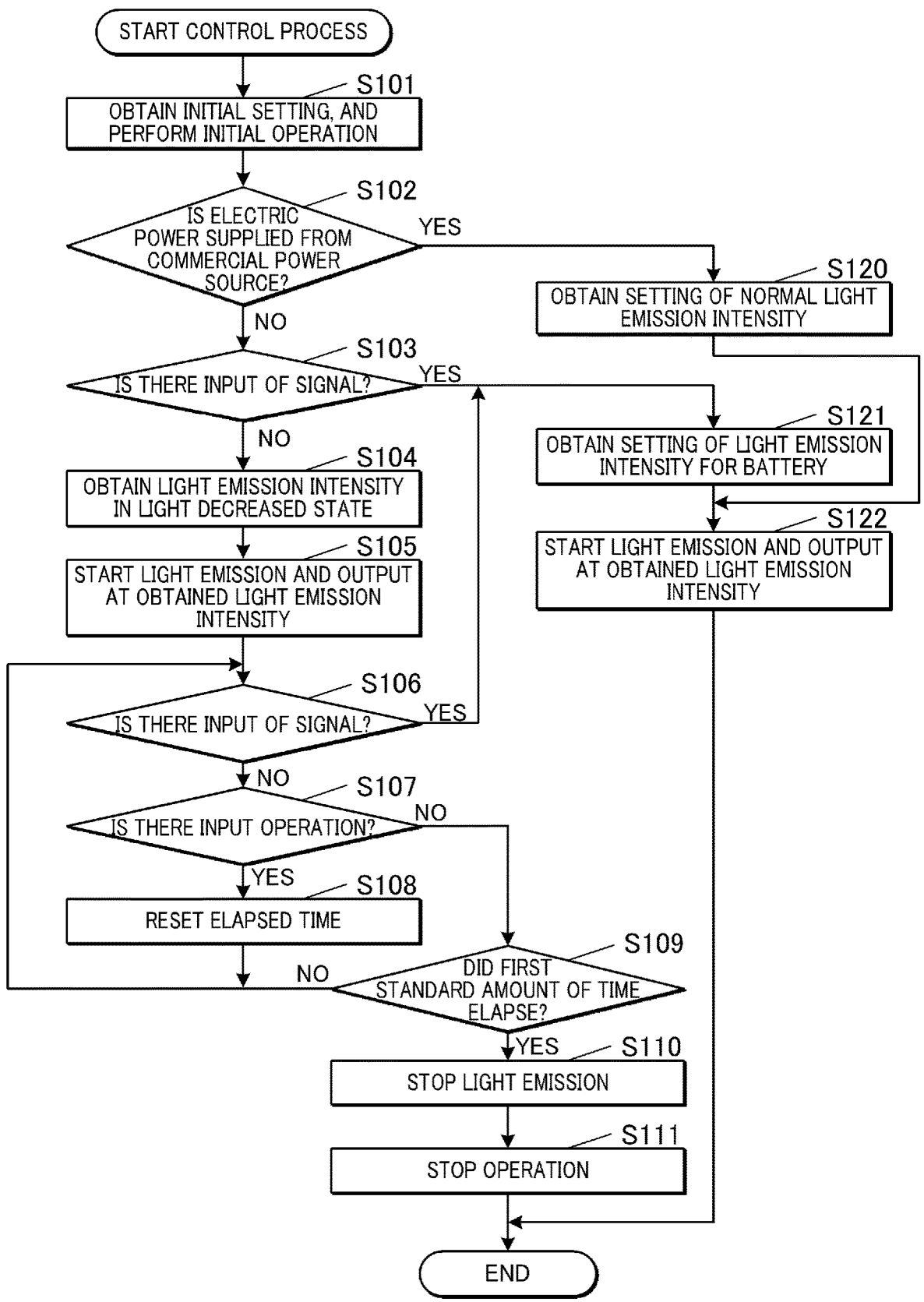
FIG. 3 is a flowchart showing a control procedure of a start control process performed in the projecting apparatus according to the first embodiment.

FIG. 3 is a flowchart showing a control procedure performed by the CPU 11 in a start control process executed in the projecting apparatus 1 according to the present embodiment. The start control process includes a light emission control method according to the present embodiment. When the operation reception unit 15 detects a predetermined input operation and the CPU 11 starts, the program 121 is read and the start control process starts.

When the start control process starts, the CPU 11 obtains the initial setting from the ROM 12 and performs various initial operations (step S101). The CPU 11 determines whether the electric power is supplied from the commercial power source based on the signal from the electric power supplier 20 (step S102). When it is determined that there is electric power supply from the commercial power source ("YES" in step S102), the CPU 11 obtains from the light amount setting 122 a normal setting level of the light emission intensity (step S120). The CPU 11 controls the light emitter 161 to emit light at the obtained setting level of the light emission intensity, and to output light from the output opening (step S122). When the image data of the image which is to be projected is input (obtained), the CPU 11 may project and display the image to be projected immediately, or may proceed to the projecting of the image to be projected after performing an initial projection (for example, a specific logo, trademark or index). Then, the CPU 11 ends the start control process.

When it is determined that there is no electric power supply from the commercial power source ("NO" in step S102), the CPU 11 determines whether there is input of the output image data through the input terminal 141 or the wireless LAN interface 142 (step S103). In practice, only whether the connection of the cable to the input terminal 141 or the connection of communication with external devices (whether communication is performed) may be determined without determining the input of the image data (whether the state is a state in which the image data can be obtained). When it is determined that there is input of the signal ("YES" in step S103), the CPU 11 obtains the level of the light emission intensity set for the battery operation from the light amount setting 122 (step S121). Then, the process of the CPU 11 proceeds to step S122.

When it is determined that there is no input of the signal ("NO" in step S103), the CPU 11 obtains the light emission intensity in a light decreased state from the light decrease setting 123 (step S104). The CPU 11 starts the light emission and output by the light emitter 161 at the obtained level of the light emission intensity (step S105). The CPU 11 starts counting the elapsed time from the start of emission in the light decreased state.

The processes in steps S103 to S105 are included in the light decreasing step in the light emission control method according to the present embodiment and the light decreasing in the program.

The CPU 11 determines whether there is input of the signal (step S106). When it is determined that there is input of the signal ("YES" in step S106), the process in the CPU 11 proceeds to step S121.

When it is determined that there is no input of the signal ("NO" in step S106), the CPU 11 determines whether the input operation is detected (step S107). As described above, the input operation of the target to be detected is not limited to a string of effective operations. When it is determined that the input operation is detected ("YES" in step S107), the CPU 11 resets the elapsed time being counted, and restarts the counting (step S108). Then, the process of the CPU 11 returns to step S106.

When it is determined that the input operation is not detected ("NO" in step S107), the CPU 11 determines whether a standard amount of time passed, that is, whether the counted elapsed time exceeds the standard amount of time (step S109). When it is determined that the standard amount of time has not passed ("NO" in step S109), the process by the CPU 11 returns to step S106. When it is determined that the standard amount of time passed ("YES" in step S109), the CPU 11 stops the light emission operation in the light reduced state by the light emitter 161 (step S110). The CPU 11 stops the operating (step S111) and ends the start control process.

As described above, the projecting apparatus 1 according to the present embodiment includes a projector 16 which outputs projected light, the inputter 14 which obtains from outside image data of the image to be projected by the projector 16, and a CPU 11 which controls the operation of the projector 16. When the image data is not obtained by the inputter 14, the CPU 11 sets the state to the light decreased state in which the light intensity of the projected light, that is, the light emission intensity of the light emitter 161 is lower than the standard value.

By controlling the light emission intensity to be a state which is not high when the projection of the image is not performed according to the image data, the output of light which is unnecessary and which may be a hazard to the eye can be reduced in the projecting apparatus 1 to a range in which it is possible to perform positioning and focusing so as not to reduce convenience. The output of light is not performed at a strong intensity in a state in contact with the inside of a storage member. Therefore, it is possible to reduce problems occurring in a storage member and the main body 10 due to the output light irradiating the storage member at a close distance continuously in a concentrated state and heat being applied locally and unusually. By maintaining the light emission intensity at a low level, it is possible to reduce unnecessary power consumption.

The projecting apparatus 1 includes the electric power supplier 20 which includes the battery 21 and which supplies the electric power by selecting from either the external power source or the battery 21 depending on whether there is connection to the external power source (when connected to the external power source, switches to power supply from the external power source). The CPU 11 is able to switch to the light decreased state when the electric power is supplied from the battery 21. When the electric power is not supplied from the battery 21, there is no need to worry about the amount of power remaining in the battery 21 lacking, and the possibility that the apparatus is started unintentionally while transporting the apparatus is very low. Therefore, in this case, there is no need to decrease the light emission intensity and to switch to the light decreased state. The state is switched to the light decreased state only when there is a concern for lack of electric power, or there is a concern that the storage member and the main body 10 may be overheated. Therefore, even if there is no image data, it is easy for those viewing the presentation being projected to determine the suitable position to view the presentation and it is easy to adjust the state of the light shielded in the venue.

The projector 16 includes the light emitter 161 and outputs the projected light using the light emitted from the light emitter. The light emission intensity of the light emitter 161 can be changed at a set range, here, two or more predetermined levels. In the light decreased state, the CPU 11 sets the light emission intensity of the light emitter 161 to be lowest (lowest level) within a set range that can be changed. That is, by emitting light at the lowest level that can be used, the light amount is to be a degree convenient for preparations such as positioning and focusing in situations such as during preparations when those other than the person in charge of preparations do not have to view the display contents certainly and in situations that are not intended. The irradiating is not performed brighter than necessary. By reducing the light emission intensity to the lowest level that is necessary, the power consumption and the heating can be suppressed to a minimum.

The projecting apparatus 1 includes an operation reception unit 15 which receives the input operation from outside. The CPU 11 determines a display state by the projector 16 in the light decreased state according to the set contents. The light decreased state may be set when the apparatus is started to prepare for projection or when the presenter is switched among a plurality of presenters. By setting the display contents for such case in advance and storing the display contents in the ROM 12, it is possible to obtain a preferable display state each time without a burden.

Moreover, in the above display state, the display color is included. By being able to switch the display color when there is no image data, it is possible to suitably adjust the atmosphere of the venue during preparations and when the presentation is switched.

In the above display state, display of at least one of the indexes, symbols and letters is included. Preparations such as positioning and focusing as described above may be performed when there is no image data. Therefore, by setting in advance contents useful for the above preparations and projecting the contents, the operation can be made more efficient.

The CPU 11 changes the light intensity of the projected light in the light decreased state depending on the string of input operation including two or more operations on the operation reception unit 15. Even in the light decreased state, if it is difficult to perform suitable preparation without increasing the light emission intensity due to the brightness of the surroundings, the light intensity can be increased by the predetermined input operation on the operation reception unit. In this case, in order to avoid unintentional increase of the light intensity due to contact with other objects during transportation, input operation of two or more steps may be necessary. With this, specifically, by reducing the light emission intensity and obtaining the light decreased state, the electric power consumption of the battery 21 being wasted unintentionally and the overheating of the storage member can be reduced while enhancing the convenience of preparation.

The inputter 14 includes the input terminal 141 of the cable connected to the external device. The CPU 11 may determine whether the image data is input by detecting whether there is connection of the cable to the input terminal 141. The process can be made easier by determining whether the light decreased state is necessary by detecting the physical connection without strictly detecting the input of the image data. Since it is difficult to assume a situation in which the external device remains connected inside a storage member, by suitably reducing the light emission intensity, it is possible to suitably suppress increase of the consumption of electric power and overheating during unintentional lighting.

The inputter 14 includes a wireless LAN interface 142 which performs wireless communication with external devices. The CPU 11 may determine whether the image data is obtained by detecting whether the wireless LAN interface 142 is communicating with the external devices. Similar to the input terminal 141, the process can be made easier by assuming that the image data can be obtained if there is connection for communication even if the actual input of the image data is not strictly detected.

The CPU 11 stops output of the projected light when there is no input of the image data within the standard amount of time after the light emission operation in the light decreased state starts. Even if the light is intentionally turned on for preparations, the amount of time necessary for preparations is usually not that long. Therefore, when the state in which there is no image data continues for a long amount of time well over the time necessary for preparations, the light emission operation is suitably stopped and the output of the projected light is stopped. With this, unnecessary power consumption can be reduced.

The CPU 11 stops the output of the projected light when there is no input operation on the operation reception unit 15 or there is no input of image data within the standard amount of time after the light emission operation in the light decreased state starts. Even if an amount of time longer than normal is necessary for preparations, the light emission operation in the light decreased state can be continued by the input operation on the operation reception unit 15. Therefore, the convenience is not greatly decreased. By limiting the input operation to effective operation, even if the unintentional input operation is repeated during transportation, the light emission operation is stopped midway. Therefore, it is possible to suppress overheating of the storage member and it is possible to decrease wasted consumption of power.

The light emission control method according to the present embodiment includes a light decreasing step in which the light decreased state with a light intensity of the projected light (light emission intensity of the light emitter 161) being lower than the standard value is set when the image data is not obtained by the inputter 14.

As described above, by performing control to not set a state in which the light emission intensity is large while the display of the image according to the image data is not performed, the light emission control method is able to decrease output of the projected light at an unnecessary light amount without decreasing the convenience by being able to perform positioning and focusing. Moreover, the output of the light is not performed at a strong intensity when in contact with the inside of the storage member, for example. Therefore, it is possible to decrease problems occurring in the storage member and the main body 10 due to the unusual amount of heat being applied to the storage member. Moreover, by reducing the light emission intensity and setting the light decreased state, the power consumption can be decreased.

When the image data is not obtained by the inputter 14, the program 121 according to the present embodiment allows the computer (CPU 11) in the projecting apparatus 1 to function as a light decreaser which sets the light decreased state in which the light intensity of the projected light (light emission intensity of the light emitter 161) is lower than the standard value.

By installing the software program for control, and allowing the CPU 11 to execute the program, it is possible to suppress decrease in the convenience easily and without a heavy burden while decreasing the output of the projected light at an unnecessary light amount. Moreover, by suppressing the amount of light irradiated locally at a close distance to the storage member, the overheating of the storage member can be suppressed, the light emission intensity itself can be decreased, and the electric power consumption can be decreased.

Second Embodiment

Next, a projecting apparatus 1a according to the second embodiment is described.

Figure 4:
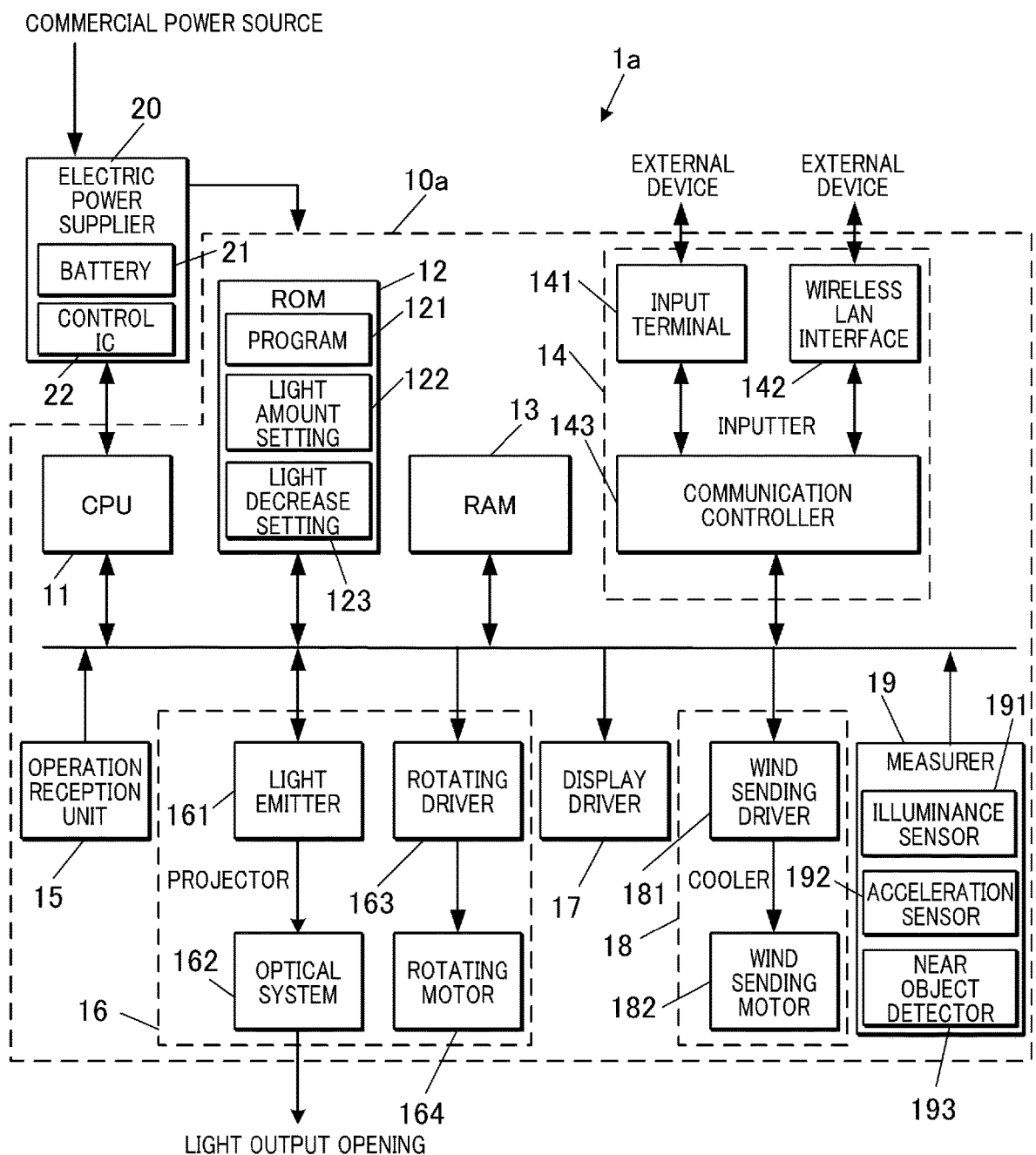
FIG. 4 is a block diagram showing a functional configuration of a projecting apparatus according to a second embodiment.

FIG. 4 is a block diagram showing a functional configuration of the projecting apparatus 1a according to the second embodiment. Such projecting apparatus 1a is the same as the projecting apparatus 1 according to the first embodiment with the exception of a measurer (measurement apparatus) 19 being further added to the main body 10a. The same reference numerals are applied to the same configuration and the detailed description is omitted.

The measurer 19 measures the various states of the apparatus and outputs the result to the CPU 11. The measurer 19 includes an illuminance sensor 191 (second measurer), an acceleration sensor 192 (first measurer), and a near object detector 193 (detector, detecting apparatus). The illuminance sensor 191 measures the illuminance of the outside of the main body 10a. Although not limited, the illuminance sensor 191 is positioned on a surface the same as the output opening but separated from the output opening, and measures the illuminance (brightness) of the surroundings in the projecting direction of the image. The illuminance is the index for the light emission intensity in normal projecting. By measuring the reflected light with the illuminance sensor 191 when there is an object near the output opening and the projected light is reflected, the illuminance is greatly increased and it is assumed that the state is in a state unsuitable for projection. On the other hand, there is some light even in a hall or a meeting room. Therefore, when the illuminance is almost zero, it is assumed that the illuminance sensor 191 (that is, the front) is covered by an object, and it is assumed that the state is in a state unsuitable for projection.

The acceleration sensor 192 measures the acceleration (moving state) in three axis directions of the apparatus including gravitational acceleration. By specifying the direction of the gravitational acceleration, a posture of the projecting apparatus 1a is specified. According to the changing pattern of the acceleration, it is possible to assume that the apparatus is being transported (moving state), and the like.

The near object detector 193 detects whether there is (exists) another object (normally a solid but may be a liquid) in the surroundings of the surfaces of the main body 10a, at least near the front surface (projecting direction). For example, the near object detector 193 may be an infrared sensor or a magnetic sensor. When there is an object in a position near the front surface, specifically, closer than the shortest focus distance of the projected light (optical system 162), it is assumed that the light emitter 161 is not turned on with an intension to perform projection. Similarly, when the near object is detected in a plurality of surfaces among the six surfaces, specifically, a side other than the side of the set surface specified by the acceleration sensor 192, it is considered that the apparatus is overlapped with or is near a bag or a case and it is assumed that it is not a situation in which projection is performed.

In the projecting apparatus 1a according to the present embodiment, one or all of the measured results of the measurer 19 is used to estimate the possibility that the surrounding situation is a state unsuitable for projection, and the light emission intensity, standard value, and light decreased degree are determined according to the estimated result (based on the measured result). The setting of the light emission intensity according to the measured result is stored as table data in the ROM 12, and may be referred by the CPU 11, or may be changed and adjusted from the light emission intensity of the initial setting by a predetermined calculation formula.

Figure 5:
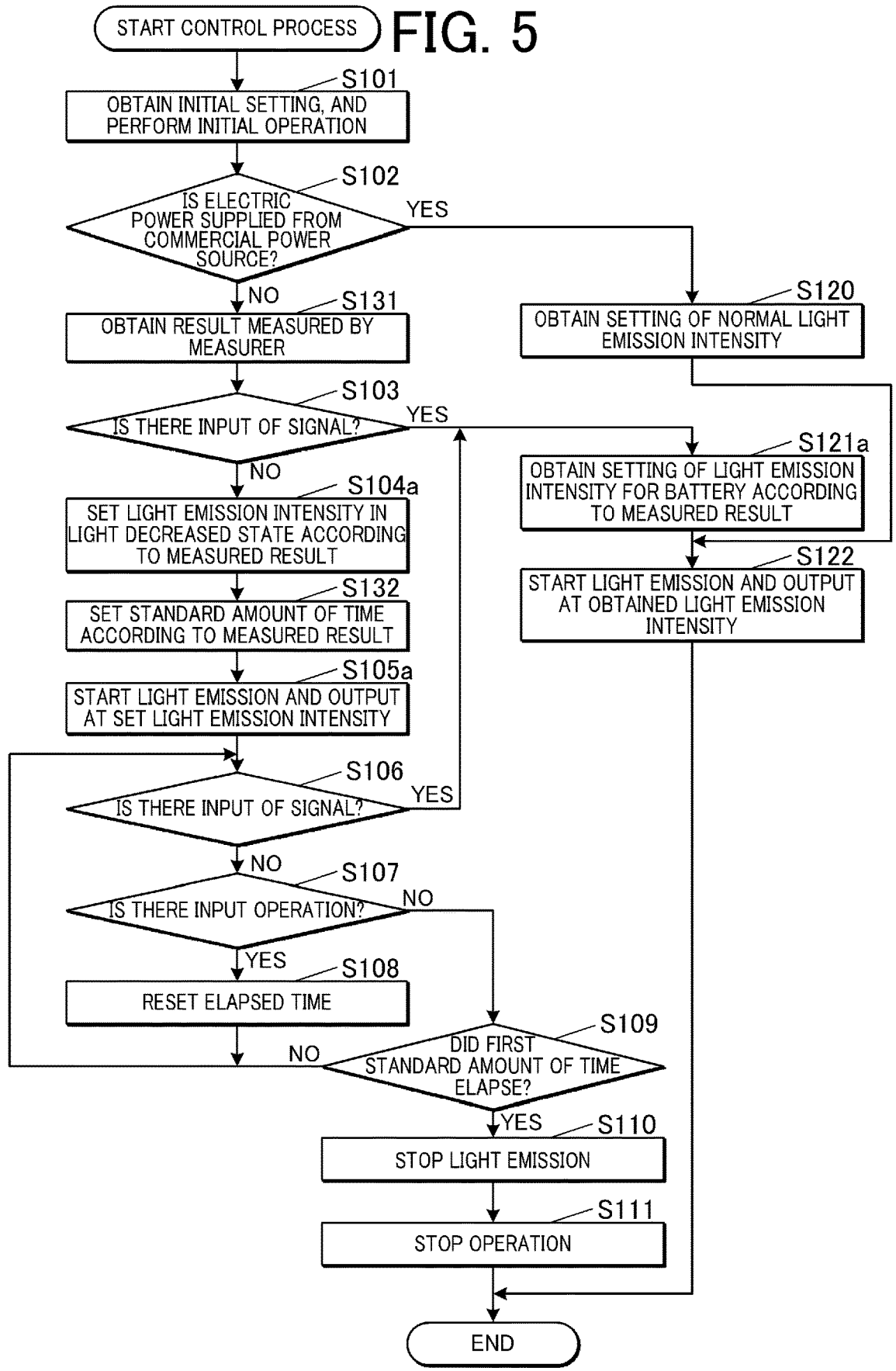
FIG. 5 is a flowchart showing a control procedure of a start control process performed in the projecting apparatus according to the second embodiment.

FIG. 5 is a flowchart showing a control procedure by the CPU 11 to perform a start control process executed in the projecting apparatus 1a according to the second embodiment. Compared to the start control process executed in the projecting apparatus 1 according to the first embodiment, in the present start control process, steps S131 and S132 are added, and steps S104, S105 and S121 are replaced with steps S104a, S105a, and S121a. The other processes are the same. The same reference numerals are applied to the same processes and the detailed description is omitted.

When it is determined that there is no electric power supply from the commercial power source in the determining process in step S102 ("NO" in step S102), the CPU 11 obtains the measured result by the measurer 19 (step S131). Then, the process by the CPU 11 proceeds to step S103. When it is determined that there is no input of the signal in the determining process in step S103 ("NO" in step S103), the CPU 11 sets the light emission intensity at the light decreased state according to the measured result (step S104a). For example, when it is determined that the possibility that the user operated and turned on the projecting apparatus 1a with intension is low based on the measured result, the CPU 11 sets the light emission intensity level to the lowest level. When the possibility that the user operated and turned on the projecting apparatus 1a with intention is not that low, the CPU 11 sets the light emission intensity level one level higher than the lowest intensity.

The CPU 11 sets the standard amount of time according to the measured result (step S132). For example, when it is determined that the possibility that the user intentionally operated and turned on the projecting apparatus 1a is low based on the measured result, the CPU 11 sets the standard amount of time shorter than the initial value (five minutes). Then, the CPU 11 starts the light emission operation by the light emitter 161 at the set light emission intensity, and outputs light from the outputting opening (step S105a). Then, the CPU 11 starts counting the elapsed time. The process by the CPU 11 proceeds to step S106.

In the determining process in step S103, when it is determined that there is input of the signal ("YES" in step S103), the CPU 11 obtains the setting of the light emission intensity for the battery according to the measured result (step S121a). For example, the light emission intensity for the battery can be determined to be lower as the distance to the detected object in the image projecting direction becomes closer, for example. When the detected value of the illuminance sensor is high and low, it is possible to perform the setting so that the light emission intensity becomes low in both cases. Then, the process by the CPU 11 proceeds to step S122.

As described above, the projecting apparatus 1a according to the second embodiment includes the measurer 19 which measures the state of the apparatus. The CPU 11 determines the light intensity of the projected light in the light decreased state based on the measured result of the measurer 19. According to the measuring operation by the measurer 19, the user is able to enhance the accuracy of determining whether the apparatus is intentionally turned on by the user. Based on the above determination result, the light intensity (light emission intensity) in the light decreased state is adjusted and the convenience is not lost. At the same time, the unnecessary electric power consumption and the overheating of the storage member can be reliably suppressed.

The projecting apparatus 1a includes the near object detector 193 which detects the object exiting in at least the projecting direction projected by the projector 16. The CPU 11 determines the light intensity of the projected light in the light decreased state according to the detection result of the near object detector 193. When there is an object in a close distance in the projecting direction, the possibility that the light is turned on intentionally to perform the projecting is low, and the light intensity of the projected light can be decreased as much as possible. The light intensity necessary for the preparation may change according to the distance to the projected target. Therefore, by changing the light intensity according to the detected result of the near object detector 193, the overheating of the storage member can be suppressed effectively. By reducing the light emission intensity during unnecessary output, the electric power consumption can be decreased even more effectively.

The present invention is not limited to the above embodiment and various changes are possible. For example, according to the above embodiment, when the apparatus is started, it is determined until the image data is input or until the standard amount of time elapses whether to switch to the light decreased state based on whether there is input of the image data, but the present invention is not limited to the above. Even if the input of the image data is cut in the middle such as due to the switch of the presenter or a break in the middle of the presentation, the state can be similarly switched to the light decreased state. In this case, if the acceleration sensor 192 does not detect a large movement of the projecting apparatus 1a according to the second embodiment, it is considered that the adjustment of the focal position and the projecting position is finished. Therefore, even if the measured illuminance increases temporarily, the light emission intensity in the light decreased state does not have to be increased according to the measured result.

According to the first embodiment, the light emission intensity in the light decreased state is to be uniformly the lowest level, but the light emission intensity determined uniformly as the light decreased state is not limited to the lowest level. The light emission intensity may be any level lower than the standard.

According to the above embodiment, the standard value regarding the light emission intensity in the light decreased state is the maximum light emission intensity for the battery, but the light emission intensity can be lower than the above. When the light emission intensity when the apparatus is started is set in advance to a value lower than the standard value, the light can be output at the light emission intensity with substantially the same level as the above setting (that is, normal start of the apparatus) even in the light decreased state. When the light emission intensity when the apparatus is started is set to be lower than the initial value of the light emission intensity in the light decreased state, the setting of the light emission intensity in the light decreased state can be changed in coordination with the setting of the start of the apparatus to be equal to or lower than the light emission intensity when the apparatus is started.

According to the present embodiment, when there is no image data, the display content is set to a single fixed pattern but the embodiment is not limited to the above. The displayed color may be changed or the displayed letters, symbols and indexes may change or be erased as the time passes. Such change can be set in advance or the letters, symbols and indexes may be automatically erased in the middle without setting. Alternatively, the display contents may be determined to be only one single pattern and setting may not be possible.

According to the present embodiment, whether the image data is input is determined by whether there is connection to the input terminal 141 of the cable. Alternatively, it is possible to determine that there is input of the image data when connection for communication is established by wireless LAN connection.

According to the present embodiment, only when there is electric power supply from the battery 21, the state is switched to the light decreased state when there is no input of the image data. In addition, the state can be switched to the light decreased state when there is power supply from the commercial power source. Normally, when the projecting apparatuses 1 and 1*a* are transported, the supply of electric power cannot be received from the commercial power source. Therefore, the possibility that the apparatus is started without intension is low and the charge amount of the battery 21 is not reduced. Still, the electric power consumption can be reduced.

The electric power supplier 20 may be included in the main body 10 or may be directly attached detachably to the main body 10. The external power source which can charge the battery 21 is not limited to a typical commercial power source (AC 100V in Japan). Other batteries with large capacities, generators and other power source apparatuses can supply the electric power.

According to the second embodiment, the measurer 19 includes the illuminance sensor 191, the acceleration sensor 192, and the near object detector 193. Alternatively, the measurer 19 may only include some of the above. The measurer 19 may include a sensor other than the acceleration sensor 192 so as to be able to detect horizontal positioning. Instead of the near object detector 193, the measurer 19 may include a sensor which can measure the distance to the close object. In this case, the measurer 19 is able to measure the distance to the projecting surface.

According to the above embodiment, the light emission operation is stopped if the light decreased state without input operation continues for a standard amount of time. Alternatively, the determination of whether there is input operation does not have to be performed. Moreover, the light emission operation from the light decreased state does not have to be stopped. Instead of stopping the light emission operation, the light emission intensity may be gradually decreased every time a predetermined amount of time passes until the light emission intensity becomes the lowest level.

According to the above embodiment, the control of the determination of the light decreased state is performed by the projecting apparatuses 1 and 1*a*. Alternatively, the control apparatus outside the projecting apparatuses 1 and 1*a* may perform the control of the determination and control the light emission intensity of the projecting apparatuses 1 and 1*a*.

According to the above embodiment, the light emission intensity at the standard illuminance is described to be the light intensity of the projected light. Alternatively, the light decreased state can be achieved without decreasing the light emission intensity by adjusting a reflected angle control of a DMD and decreasing the light intensity of the projected light (scattering some of the light). In this case, the consumed power is not decreased, and some or all of the emitted light is collected and not output from the output opening. Therefore, it is possible to avoid problems such as the stored member being an overheated state locally.

According to the present embodiment, the image data of the projecting target image can be obtained by wireless LAN through the wireless LAN interface 142. Alternatively, the image data can be obtained by wireless data communication other than wireless LAN or the configuration regarding wireless communication such as the wireless LAN interval 142 does not have to be included.

According to the above description, a ROM 12 including a rewritable nonvolatile memory such as a flash memory is used as the computer-readable storage medium storing the program 121 regarding the light emission control according to the present invention. However, the present embodiment is not limited to the above. Other computer-readable media which can be applied include other nonvolatile memory such as a MRAM or a portable storage medium such as a CD-ROM and a DVD disk. A carrier wave can be applied to the present invention as a medium which provides data of the program regarding the present invention through communication lines.

Other than the above, the specific configuration, contents of the control operation and the procedure regarding the projecting apparatuses 1 and 1*a* can be suitably changed without leaving the scope of the present invention.

Although various embodiments have been shown and described, the scope of the present invention is not limited by the above-described embodiments, and the scope of the present invention includes the scope as described in the attached claims and its equivalents.

What is claimed is:

1. A projecting apparatus comprising:
   a projector configured to output projected light;
   an operation reception unit configured for receiving input operations from a user;
   a receiver configured to obtain from outside, image data of a target image projected by the projector; and
   a processor configured to control operation of the projector,
   wherein,
   in a case in which the image data is not obtained by the receiver, the processor is configured to set a light intensity of the projected light to a light decreased state lower than the light intensity of the projected light in a case in which the image data is obtained by the receiver, and simultaneously, to allow the projector to project the target image including a display of at least one of an index, a symbol, and a letter so as to enable a user to perform an input operation using the operation reception unit to cause the processor to adjust a focus while continuing the light decreased state of the projected light.

2. The projecting apparatus according to claim 1, further comprising, an electric power supplying apparatus which includes a battery and which is configured to supply electric power selectively from either an outside power source or the battery depending on whether there is connection to the outside power source,
   wherein, the processor is configured to be capable of switching to the light decreased state when the electric power is supplied from the battery.

3. The projecting apparatus according to claim 1, wherein,
   the projector includes a light emitter, and the projector is configured to output the projected light based on light emitted by the light emitter,
   the light emitter is configured to be capable of changing the light intensity within a set range, and
   the processor is configured to set a light emission intensity of the light emitter to a lowest level within a set range when in the light decreased state.

4. The projecting apparatus according to claim 1,
wherein, the processor determines a display state by the projector in the light decreased state according to contents set through the operation reception unit.

5. The projecting apparatus according to claim 4, wherein, the display state includes a display color.

6. The projecting apparatus according to claim 1,
wherein, the processor changes the light intensity in the light decreased state according to a string of input operations including two or more operations on the operation reception unit.

7. The projecting apparatus according to claim 1, wherein,
the receiver is configured to include a connection terminal of a cable connected to an external device, and
the processor is configured to determine whether the image data is obtained by detecting whether there is connection of the cable to the connection terminal.

8. The projecting apparatus according to claim 1, wherein,
the receiver is configured to include a wireless communicator which performs wireless communication with external devices, and
the processor is configured to determine whether the image data is obtained by detecting whether communication with the external device is performed by the wireless communicator.

9. The projecting apparatus according to claim 1, wherein, the processor is configured to stop output of the projected light when the image data is not obtained within a standard amount of time from a start of output of the projected light in the light decreased state.

10. The projecting apparatus according to claim 1
wherein, the processor is configured to stop output of the projected light when there is no input operation regarding a change in a setting on the operation reception unit or the image data is not obtained within a standard amount of time after output of the projected light starts in the light decreased state.

11. A light emission control method for a projecting apparatus including a projector configured to output projected light, an operation reception unit configured for receiving input operations from a user, and a receiver configured to obtain from outside, image data of a target image projected by the projector, the method comprising:
in a case in which the image data is not obtained by the receiver, setting a light intensity of the projected light to a light decreased state lower than the light intensity of the projected light in a case in which the image data is obtained by the receiver, and simultaneously, projecting with the projector the target image including a display of at least one of an index, a symbol, and a letter so as to enable a user to perform an input operation using the operation reception unit to adjust a focus while continuing the light decreased state of the projected light.

12. A non-transitory computer-readable storage medium having a program stored thereon for controlling a computer used in a projecting apparatus including a projector configured to output projected light, an operation reception unit configured for receiving input operations from a user, and a receiver configured to obtain from outside, image data of a target image projected by the projector, the program controlling the computer to perform,
in a case in which the image data is not obtained by the receiver, setting a light intensity of the projected light to a light decreased state lower than the light intensity of the projected light in a case in which the image data is obtained by the receiver, and simultaneously, projecting with the projector the target image including a display of at least one of an index, a symbol, and a letter so as to enable a user to perform an input operation using the operation reception unit to adjust a focus by operation by the user while continuing the light decreased state of the projected light.

13. The projecting apparatus according to claim 1, wherein at least one of the index, the symbol, and the letter is displayed to perform positioning of the display or adjusting of focus.

14. The projecting apparatus according to claim 1, wherein,
the index is a plus mark or a square bracket,
the letter is a specific letter or a string of letters, and
the symbol is a specific symbol or a string of symbols.

15. The projecting apparatus according to claim 2, wherein,
the projector includes a light emitter and the projector is configured to output the projected light based on light emitted by the light emitter;
the light emitter is configured to be capable of changing the light intensity within a set range, and
in a case in which the image data is not obtained by the receiver, the processor is configured to set maximum light emission intensity by the light emitter when the power is supplied by the battery to be lower than the maximum light emission intensity by the light emitter when the power is supplied by the outside power source.

* * * * *